US010999779B2

(12) United States Patent
Kim et al.

(10) Patent No.: US 10,999,779 B2
(45) Date of Patent: May 4, 2021

(54) METHOD FOR CONTROLLING CONGESTION WHEN CONGESTION OCCURS IN NETWORK

(71) Applicant: LG Electronics Inc., Seoul (KR)

(72) Inventors: Jaehyun Kim, Seoul (KR); Laeyoung Kim, Seoul (KR); Sangmin Park, Seoul (KR); Hyunsook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/477,292

(22) PCT Filed: Jan. 15, 2018

(86) PCT No.: PCT/KR2018/000684
§ 371 (c)(1),
(2) Date: Jul. 11, 2019

(87) PCT Pub. No.: WO2018/131970
PCT Pub. Date: Jul. 19, 2018

(65) Prior Publication Data
US 2019/0357118 A1 Nov. 21, 2019

Related U.S. Application Data

(60) Provisional application No. 62/446,440, filed on Jan. 15, 2017.

(51) Int. Cl.
H04W 48/06 (2009.01)
H04W 28/02 (2009.01)
(52) U.S. Cl.
CPC ....... H04W 48/06 (2013.01); H04W 28/0289 (2013.01)

(58) Field of Classification Search
None
See application file for complete search history.

(56) References Cited

U.S. PATENT DOCUMENTS

2017/0303259 A1* 10/2017 Lee .................. H04W 72/048
2018/0123961 A1* 5/2018 Farmanbar .......... H04L 41/0896
(Continued)

FOREIGN PATENT DOCUMENTS

| KR | 1020160044048 | 4/2016 |
| WO | 2013151246 | 10/2013 |
| WO | 2016076603 | 5/2016 |

OTHER PUBLICATIONS

International Search Report of Appl'n No. PCT/KR2018/000684, dated Apr. 11, 2018.
(Continued)

Primary Examiner — Otis L Thompson, Jr.
(74) Attorney, Agent, or Firm — Dentons US LLP

(57) ABSTRACT

One disclosure of the present specification provides a method for performing congestion control when session management congestion occurs in a network system. The method comprises the steps of: transmitting, to an access and mobility function (AMF) node, a request message requesting access to the network system; and receiving a refusal message rejecting the access request from the AMF node when the session management congestion occurs, wherein upon receiving the refusal message, the request message may not be transmitted again for a predetermined period of time.

12 Claims, 14 Drawing Sheets

(56) References Cited

U.S. PATENT DOCUMENTS

| | | | | |
|---|---|---|---|---|
| 2018/0198867 A1* | 7/2018 | Dao | .................... | H04W 76/34 |
| 2018/0352483 A1* | 12/2018 | Youn | .................... | H04W 76/18 |
| 2019/0166517 A1* | 5/2019 | Niemi | .............. | H04W 28/0215 |
| 2019/0223093 A1* | 7/2019 | Watfa | .................... | H04W 48/18 |
| 2019/0313473 A1* | 10/2019 | Kim | .................... | H04W 76/25 |
| 2019/0342821 A1* | 11/2019 | Kim | .................... | H04W 76/18 |
| 2019/0357130 A1* | 11/2019 | Garcia Azorero | .... | H04W 48/18 |
| 2020/0037386 A1* | 1/2020 | Park | .................... | H04W 76/30 |
| 2020/0059989 A1* | 2/2020 | Velev | .................... | H04W 8/08 |
| 2020/0068481 A1* | 2/2020 | Kim | .................... | H04W 8/08 |
| 2020/0084634 A1* | 3/2020 | Ohlsson | ............ | H04W 12/1006 |

OTHER PUBLICATIONS

LG Electronics Inc., "Congestion and Overload Control for Mobility Management (MM)," S2-164547, SA WG2 Meeting #116bis, Sanya, China, Aug. 23, 2016, see pp. 3-4.

LG Electronics Inc., "Congestion Control for Session Management (MM)," S2-164548, SA WG2 Meeting #116bis, Sanya, China, Aug. 23, 2016, see pp. 1-3.

* cited by examiner

METHOD FOR CONTROLLING CONGESTION WHEN CONGESTION OCCURS IN NETWORK

CROSS-REFERENCE TO RELATED APPLICATIONS

This application is the National Stage filing under 35 U.S.C. 371 of International Application No. PCT/KR2018/000684, filed on Jan. 15, 2018, which claims the benefit of U.S. Provisional Application No. 62/446,440 filed on Jan. 15, 2017, the contents of which are all hereby incorporated by reference herein in their entirety.

BACKGROUND OF THE INVENTION

Field of the Invention

The present invention relates to a method of performing congestion control when congestion occurs in a network.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |

TABLE 1-continued

| REFERENCE POINT | DESCRIPTION |
| --- | --- |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an explanatory diagram showing an expected strucuter of a next-generation mobile communication in a node viewpoint.

As may be seen with reference to FIG. 2, a UE is connected to a data network (DN) over a next-generation radio access network (RAN).

An illustrated control plane function (CPF) node performs some of or all the functions of the mobile management entity (MME) and some of or all the control plane functions of the serving gateway (S-GW) and PDN gateway (P-GW) of fourth-generation mobile communication. The CPF node includes an access and mobility management function (AMF) and a session management function (SMF).

An illustrated user plane function (UPF) node is a kind of gateway through which the data of a user is transmitted and received. The UPF node may perform some of or all the user plane functions of the S-GW and P-GW of fourth-generation mobile communication.

An illustrated policy control function (PCF) is a node controlling the policy of a provider.

An illustrated application function (AF) is a server for providing various services to a UE.

Illustrated integrated unified data management (UDM) is a kind of server managing subscriber information, like the home subscriber server (HSS) of fourth-generation mobile communication. The UDM stores and manages the subscriber information in a unified data repository (UDR).

An illustrated authentication server function (AUSF) authenticates and manages a UE.

An illustrated network slice selection function (NSSF) is a node for network slicing, such as that described later.

Meanwhile, there are two methods of processing a signaling request from a UE in the situation in which the UE has roamed a visit network, for example, a V-PLMN. In a local break out (LBO) method, that is, the first method, a signaling request from the UE is processed in the visit network. According to a home routing (HR) method, that is, the second method, the visit network forwards a signaling request from the UE to the home network of the UE.

FIG. 3 is an exemplary diagram showing the architecture of a common E-UTRAN and a common EPC.

As shown in FIG. 3, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 4 is an exemplary diagram showing the structure of a radio interface protocol in a control plane between UE and an eNodeB, and FIG. 5 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 4 and the radio protocol in the user plane of FIG. 5 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/ negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 4 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 4, the RRC layer, the RLC layer, the MAC layer, and the PHY layer placed under the NAS layer are also collectively called an Access Stratum (AS).

FIG. 6a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6b illustrates a connection process in a radio resource control (RRC) layer.

FIG. 6b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 7 shows the network overload state.

As shown in FIG. 7, the coverage of the eNodeB 200 contains a large number of UEs 100*a*, 100*b*, 100*c*, and 100*d*, which attempt data transmission/reception. As a result, if traffic in the interface between the eNodeB 200 and the S-GW 520 is overloaded or congested, the downlink data to the UE 100 or the uplink data from the UE 100 fails to be transmitted correctly.

Alternatively, if the interface between the S-GW 520 and the PDN-GW 530 or the interface between the PDN-GW 530 and a IP service network of a mobile communication provider 600 is overloaded or congested, the downlink data to the UEs 100*a*, 100*b*, 100*c*, and 100*d* or the uplink data from the UEs 100*a*, 100*b*, 100*c*, and 100*d* fails to be transmitted correctly.

If the interface between the eNodeB 200 and the S-GW 520 has an overload or congestion state, or if the interface between the S-GW 520 and the PDN-GW 530 has an overload or congested state, a node of the core network (e.g., MME) performs congestion control (NAS level congestion control) at the NAS level to avoid or control signaling congestion and APN congestion.

The congestion control at the NAS level includes an APN-based congestion control and a general NAS level mobility management control.

The APN-based congestion control refers to the EMM, GMM and (E) SM signaling congestion control associated with UE and specific APN and includes the APN-based session management congestion control and th4e APN-based mobility management congestion control.

To the contrary, in the general NAS level mobility management control, a node (MME and SGSN) in the core network rejects the Mobility Management signaling request requested by the UE/MS in a general network congestion or overload situation, thus avoiding the congestion and overload.

In general, when the core network performs the NAS level congestion control, the network carries a back-off timer value in the NAS reject message and transmits the message to the UE in an idle mode or in a connected mode. Thus, the UE does not request the EMM/GMM/(E) SM signal to the network until the back-off timer expires. The NAS rejection message includes one of attach rejection, tracking area updating (TAU) rejection, RAU (routing area updating) rejection, service rejection, extended service rejection, PDN connectivity rejection, bearer resource allocation rejection, bearer resource modification rejection, and deactivate EPS bearer context request rejection.

The back-off timer may be divided into Mobility Management (MM) back-off timers and Session Management (SM) back-off timers.

The MM back-off timer operates independently for each UE while the SM back-off timer operates independently for each APN and for each UE.

Briefly, the MM back-off timer is configured for controlling EMM/GMM signal (e.g., Attach, TAU/RAU request, etc.). The SM back-off timer is configured for controlling (E)SM signal (e.g., PDN connectivity, Bearer Resource Allocation, Bearer Modification, PDP Context Activation, PDP Context Modification request, etc.).

Specifically, when a congestion occurs in the network, the MM back-off timer is used to control the congestion in terms of the mobility management. When the timer is activated, the timer disallows the UE to perform attach, location information update (TAU, RAU), service request procedure. However, in the case of an emergency bearer service or multimedia priority service (MPS), the UE may request the signal even when the timer is operating.

As described above, the UE receives the MM back-off timer value from a core network node (e.g., MME, SGSN, etc.) or a lower layer (Access Stratum). Further, the timer may be randomly configured within a range of 15 to 30 minutes by the UE.

When a congestion occurs in the network, the SM back-off timer is used to control the congestion in terms of the session management. When the timer is running, the timer prevents the UE from configuring or modifying the associated APN-based session. However, in the case of an emergency bearer service or a multimedia priority service (MPS), the UE 100 may request the signal even when the timer is operating.

The UE receives the SM back-off timer value from the core network node (e.g., MME, SGSN, etc.) and the timer value is randomly configured within 72 hours by the UE. Further, the timer value be randomly configured within a range of 15 to 30 minutes by the UE 100.

In another example, when congestion occurs in the eNodeB 200, the eNodeB 200 may also perform congestion control. That is, when the UE requests an RRC connection establishment for the purpose of data transmission on the user plane, and when the eNodeB 200 is in the congestion state, the eNodeB 200 may send the rejection response along with an extended wait timer to the UE 100. In this case, the RRC connection establishment request cannot be re-attempted by the UE until the extended wait timer expires. To the contrary, when the UE makes an RRC connection request to transmit a control plane signal for receiving a circuit switch (CS)-based call, the eNodeB cannot reject the request even when the eNodeB 200 is in the congestion state.

Meanwhile, if overload or congestion has occurred in a network, congestion control is performed. More effective congestion control is necessary for 5G next-generation network architecture.

SUMMARY OF THE INVENTION

In an aspect, one disclosure of this specification provides a method of performing congestion control when session management congestion occurs in a network system. The method includes transmitting, to an access and mobility function (AMF) node, a request message to request access to the network system, wherein the request message includes information on a mobility management request and information on a session management request, and receiving, from the AMF node, a reject message to reject the access request when the session management congestion occurs. When the reject message is received, the request message is not transmitted again for a given time. When the session management congestion occurs, the information on the session management is not transmitted from the AMF node to a session management function (SMF) node. The reject message is generated by the AMF node.

The reject message may include a value of a session management back-off timer designating the given time.

The reject message may further include a value of a mobility management back-off timer prohibiting the mobility management request for a given time only when the session management congestion occurs.

When the session management congestion occurs, the AMF node receives information on the session management congestion from the SMF node. The reject message may be generated based on the information on the session management congestion.

The request message further includes type information to identify a type of session management. The reject message may be generated by the AMF node based on the type information.

The type information includes information on priority of the request message and whether the request message is urgent. The reject message may be generated by the AMF node further based on the information on the priority of the request message and whether the request message is urgent.

In an aspect, another disclosure of this specification provides a user equipment performing congestion control when session management congestion occurs in a network system. The user equipment includes a radio frequency (RF) unit transmitting, to an access and mobility function (AMF) node, a request message to request access the network system, wherein the request message may include information on a mobility management request and information on a session management request, and a processor controlling the RF unit. When a reject message to reject the access request is received from the AMF node because the session management congestion has occurred, the processor does not transmit the request message again for a given time. When the session management congestion occurs, the information on the session management is not transmitted from the AMF node to a session management function (SMF) node. The reject message may be generated by the AMF node.

In an aspect, yet another disclosure of this specification can provide a method of performing access control when mobility management congestion occurs in a network system accessible over a plurality of networks. The method includes transmitting, to an access and mobility function (AMF) node, a request message to request access to the system over a first network of the plurality of networks, and receiving, from the AMF node, a reject message to reject the access request when the mobility management congestion occurs in the system. The request message includes information on the first network on which the user equipment has camped. The reject message may reject only the access request through the first network.

According to one disclosure of this specification, unnecessary network resource waste and signaling overhead can be prevented by providing a method for congestion control in a congestion situation of networks.

DESCRIPTION OF EXEMPLARY EMBODIMENTS

Figure 1:
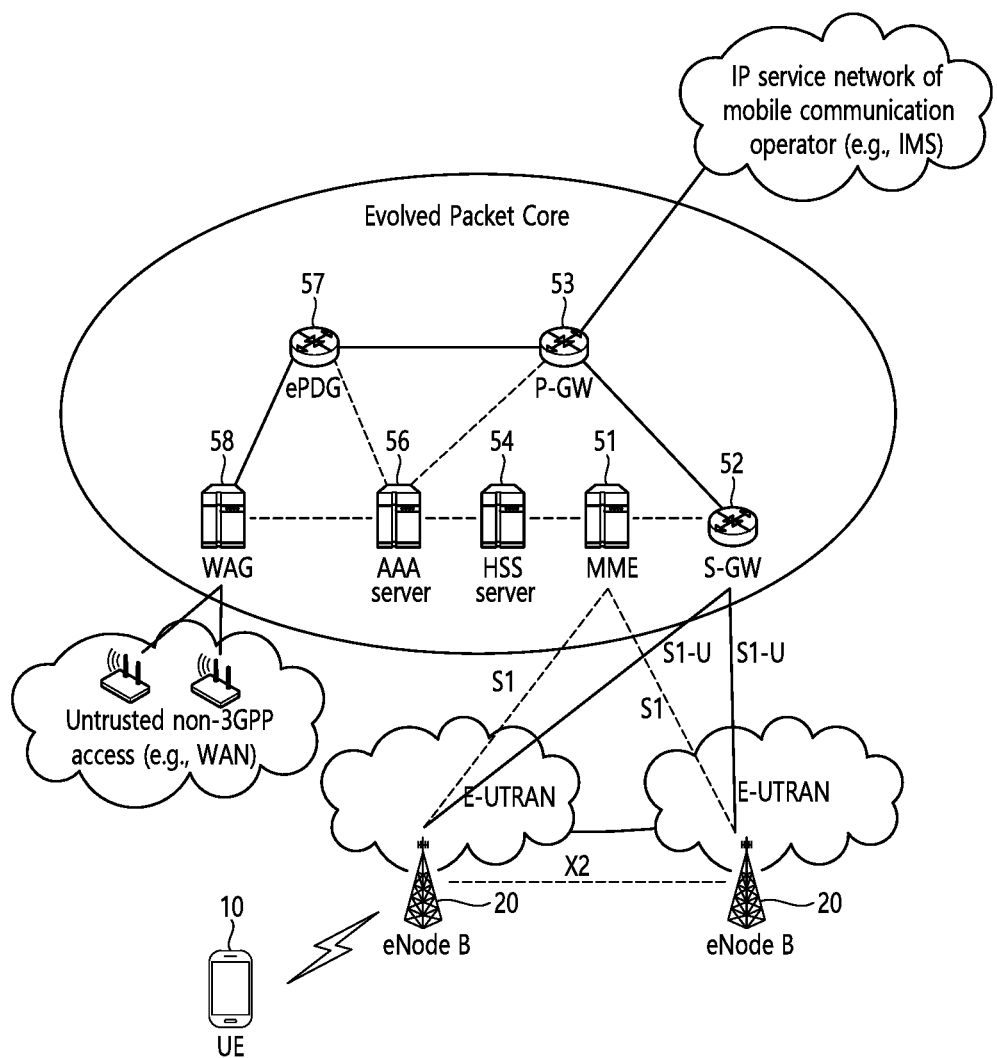
FIG. 1 is a structural diagram of an evolved mobile communication network.
Figure 2:
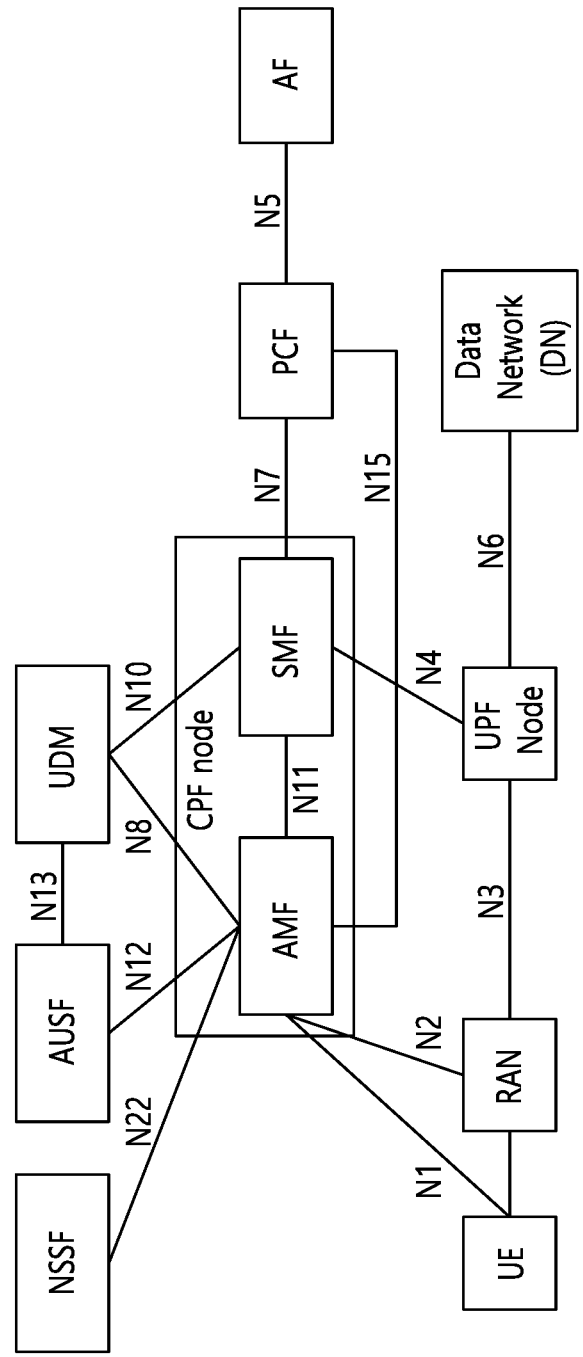
FIG. 2 illustrates an expected structure of the next-generation mobile communication from the viewpoint of a node.
Figure 3:
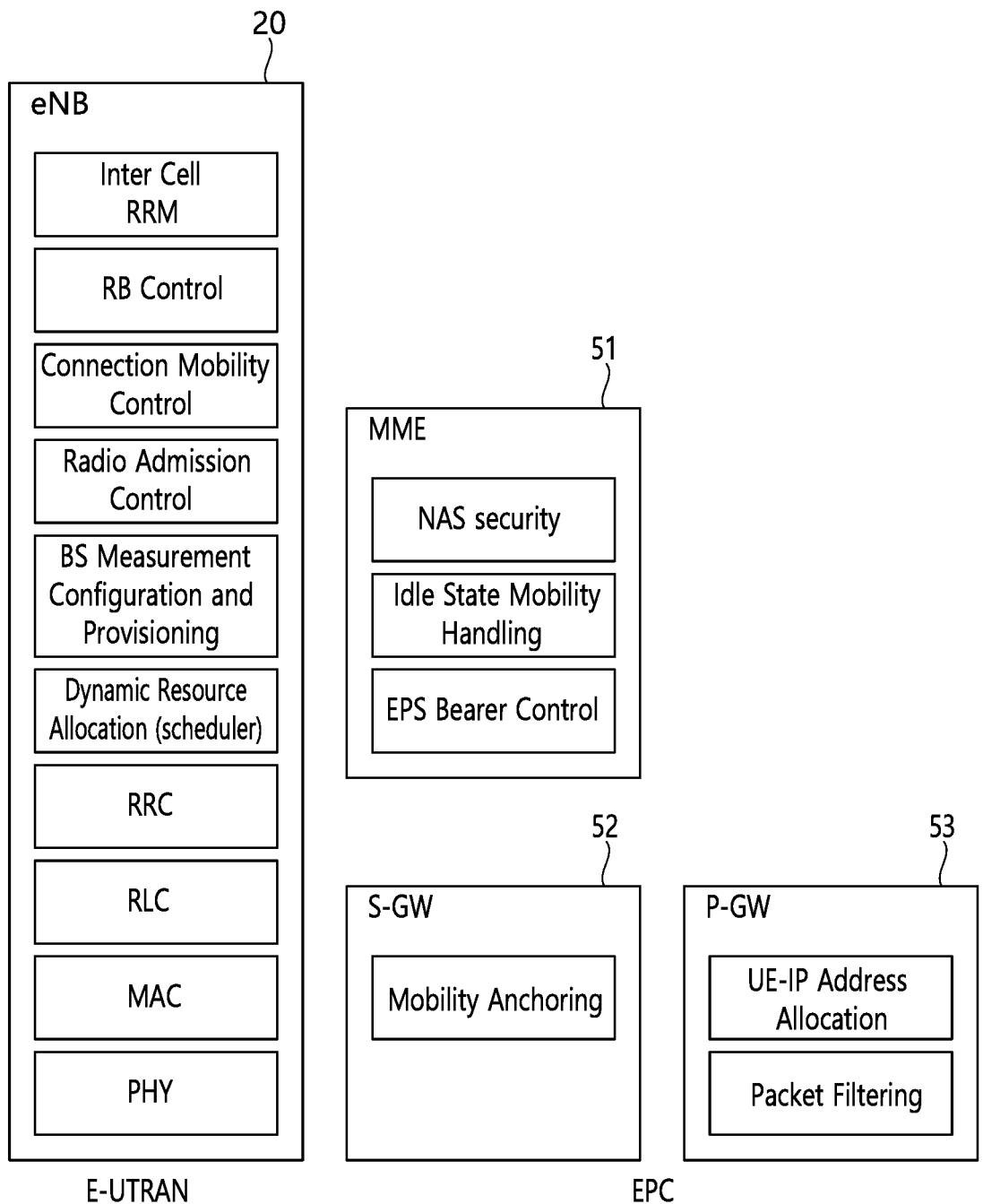
FIG. 3 is an exemplary diagram illustrating architectures of a general E-UTRAN and a general EPC.
Figure 4:
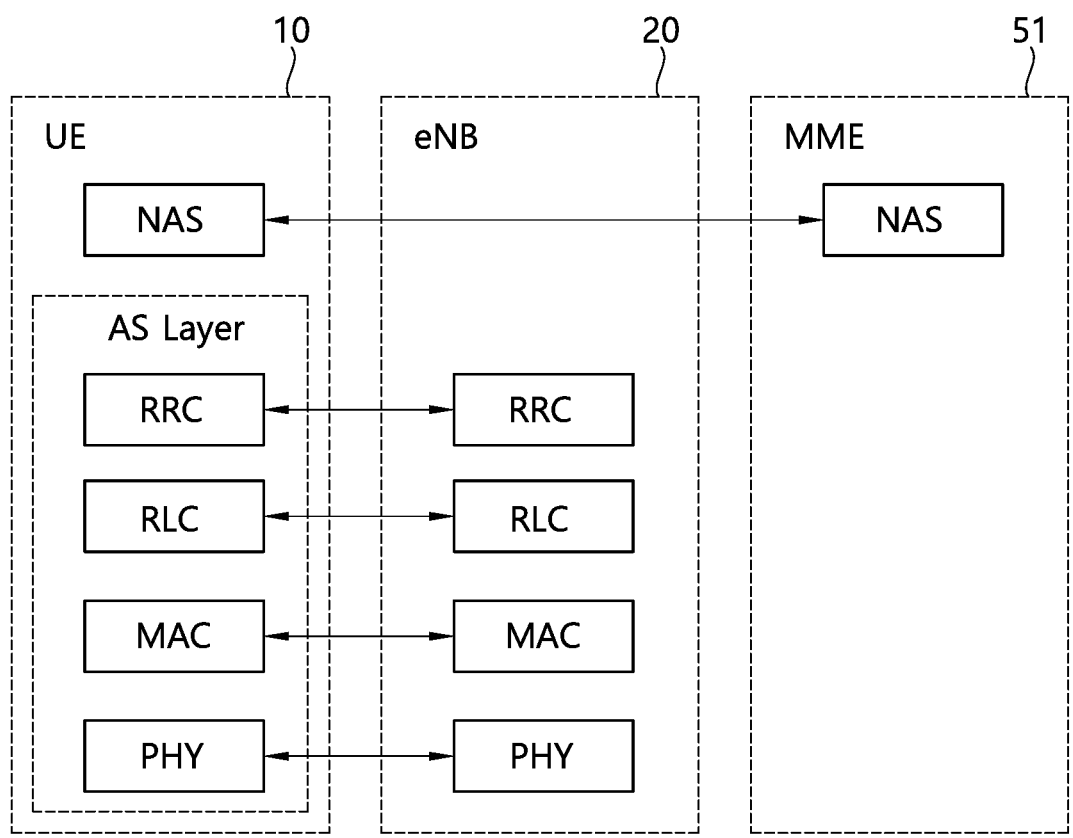
FIG. 4 is an exemplary diagram illustrating a structure of a radio interface protocol on a control plane between UE and eNodeB.
Figure 5:
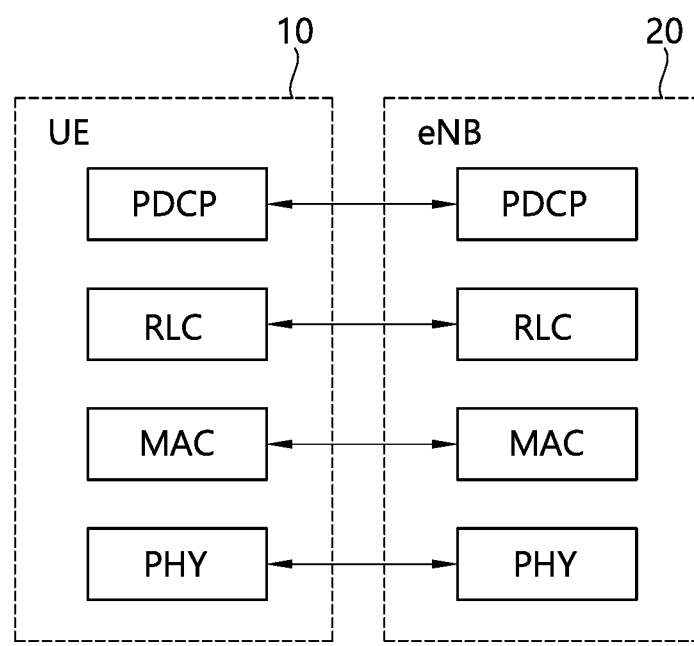
FIG. 5 is another exemplary diagram illustrating a structure of a radio interface protocol on a user plane between the UE and a base station.
Figure 6A:
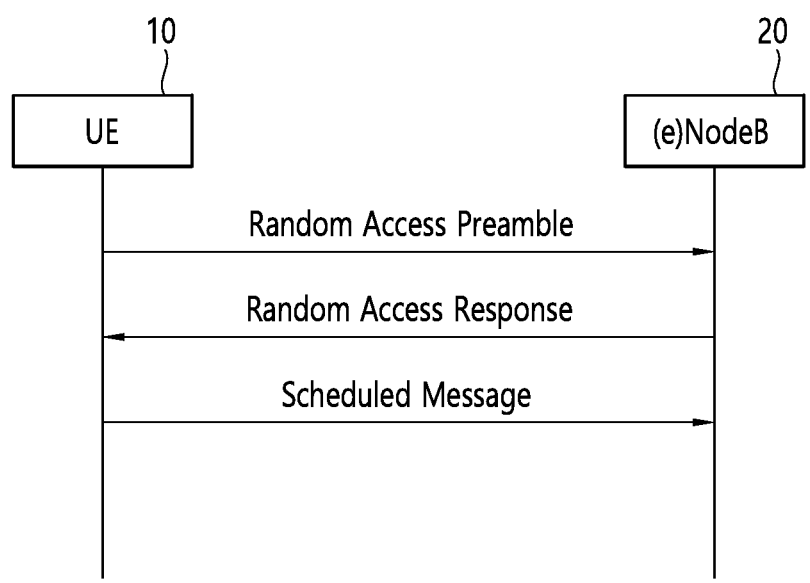
FIG. 6a is a flowchart illustrating a random access process in 3GPP LTE.
Figure 6B:
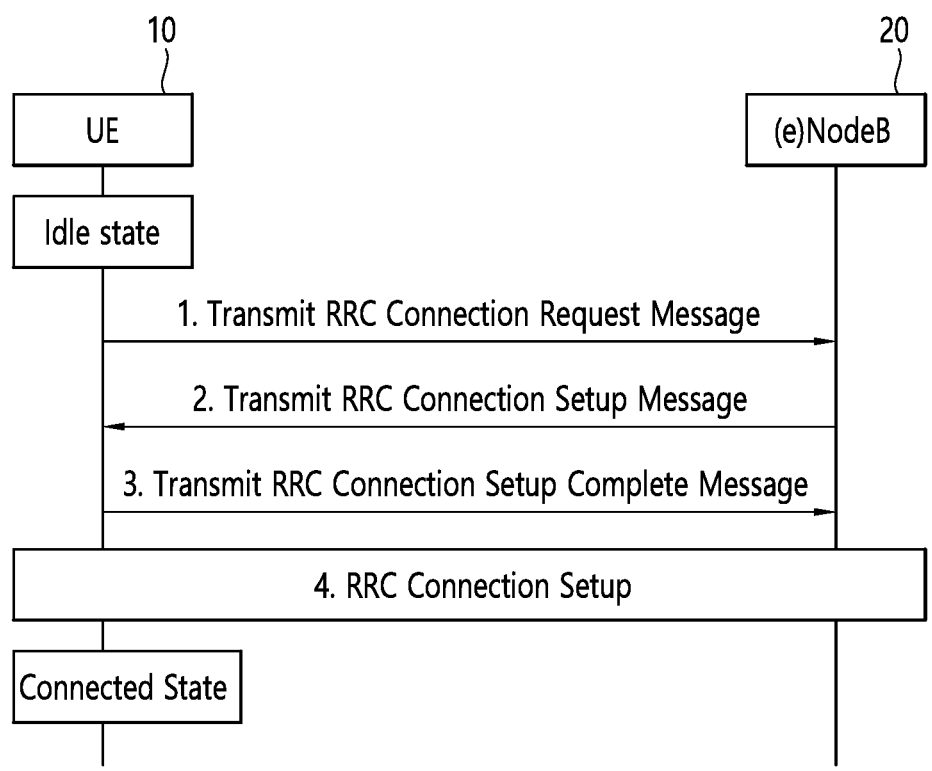
FIG. 6b illustrates a connection process in a radio resource control (RRC) layer.
Figure 7:
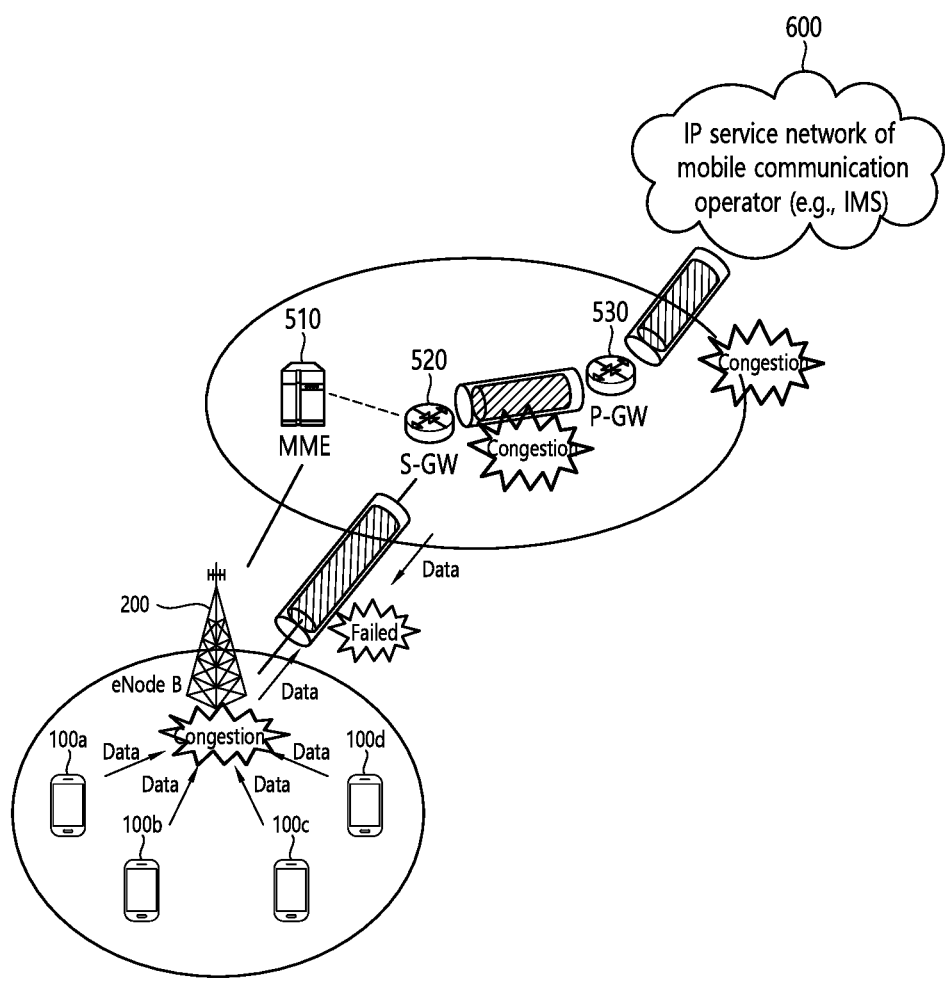
FIG. 7 shows the network overload condition.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

A Policy and Charging Rule Function (PCRF): The node of an EPS network which performs a policy decision for dynamically applying QoS and a billing policy that are different for each service flow.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

A Tunnel Endpoint Identifier (TEID): The end point ID of a tunnel set between nodes within a network, and it is set for each bearer unit of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

Mobility management (MM) operation/procedure: an operation or procedure for the mobility control/management/control of a UE. The MM operation/procedure may be construed as including one or more of an MM operation/procedure in a CS network, a GMM operation/procedure in a GPRS network, or an EMM operation/procedure in an EPS network. A UE and a network node (MME, SGSN, MSC) exchange MM messages in order to perform an MM operation/procedure.

Session management (SM) operation/procedure: an operation or procedure for controlling/managing/processing/handling the user plane and/or bearer context/PDP context of a UE. The SM operation/procedure may be construed as including one or more of an SM operation/procedure in a GPRS network or an ESM operation/procedure in an EPS network. A UE and a network node (MME, SGSN) exchange SM message in order to perform an SM operation/procedure.

Low priority UE: a UE set with NAS signal low priority. For detailed contents, reference may be made to the standard document 3GPP TS 24.301 and TS 24.008.

Normal priority UE: a normal UE not set with low priority

Dual priority UE: a UE set with dual priority. This UE is a UE set with NAS signal low priority and also configured to override the set NAS signal low priority (i.e., UE which provides dual priority support is set for NAS signalling low priority and also set to override the NAS signalling low priority indicator). For detailed contents, reference may be made to the standard document 3GPP TS 24.301 and TS 24.008.

PLMN: an abbreviation of a public land mobile network and means the network identification number of a provider. In the roaming situation of a UE, a PLMN is divided into a home PLMN (HPLMN) and a visited PLMN (VPLMN).

<Disclosure of this Specification>

When network congestion occurs in a 3GPP network system, in order to solve this problem, congestion control may be performed. The congestion control may include mobility management congestion control for controlling mobility management congestion and session management congestion control for controlling session management congestion.

In this case, the network system may mean a common core network node. That is, the network system may include a core network node including a control node or gateway in the control plane, an access and mobility management function (AMF), and a session management function (SMF).

<Mobility Management Congestion Control>

Mobility management (MM) may be performed by an AMF. The AMF may receive a request message (NAS signaling), related to mobility management, from a UE, and may perform mobility management.

According to one embodiment, when a UE performs a procedure (e.g., an attach request, a registration request, a tracking area update (TAU) (location update request), a service request) related to mobility management, the UE may request access to a network system by transmitting a request message to the network system. The request message may include a network slice ID or a network slice instance ID.

In this case, if a network system is congestion or overload, the network system may reject the request of the UE. The network system may transmit a reject message to the UE. The reject message may include a reject cause and a back-off timer. The reject cause may be any one of congestion, overload or insufficient resources. The back-off timer is used for mobility management congestion control, and may indicate the time when the UE will transmit a request message again. The back-off timer may be differently configured based on a network slice ID and a network slice instance ID. The back-off timer may be bound with the network slice ID or the network slice instance ID and used.

According to another embodiment, the request message may include at least one of a device type, a service type, a communication type, or group information. In this case, the back-off timer may be differently configured based on information (a device type, a service type, a communication type, or group information) included in the request message. The back-off timer may be bound with a network slice ID or a network slice instance ID and used.

The back-off timer used for mobility management congestion control may operate independently of a back-off timer used for session management congestion control.

<Session Management Congestion Control>

Session management (SM) may be performed by an SMF. When an AMF forwards a request message (NAS signaling), related to session management and received from a UE, to an SMF, the SMF may perform session management using a request message.

According to one embodiment, when a UE performs a procedure (e.g., a packet data unit (PDU) session request, PDU session request modification, PDU session request deactivation, PDU session disconnect/release request) related to session management, the UE may request access to a network system by transmitting a request message to the network system. The request message may include an access point name (APN) or a data network name (DNN).

In this case, if the network system is congestion or overload, the network system may reject the request of the UE. The network system may transmit, to the UE, the reject message that rejects the request of the UE. The reject message may include a reject cause and a back-off timer. The reject cause may be any one of congestion, overload or insufficient resources. The back-off timer used for session management congestion control, and may indicate the time when the UE will transmit a request message again. The back-off timer may be differently configured based on an APN and a DNN. The back-off timer may be bound with the APN or DNN and used.

According to another embodiment, the request message may further include information including at least one of an IP address, a port number, an application ID or a specific instance ID. In this case, the back-off timer may be differently configured based on information including at least one of an IP address, a port number, an application ID or a specific instance ID and an APN (or DNN). The back-off timer may be bound with information including at least one of an IP address, a port number, an application ID, a specific instance ID or a specific network slice instance ID and an APN (or DNN) and used.

A back-off timer used for session management congestion control may operate independently of a back-off timer used for mobility management congestion control.

Figure 8A:
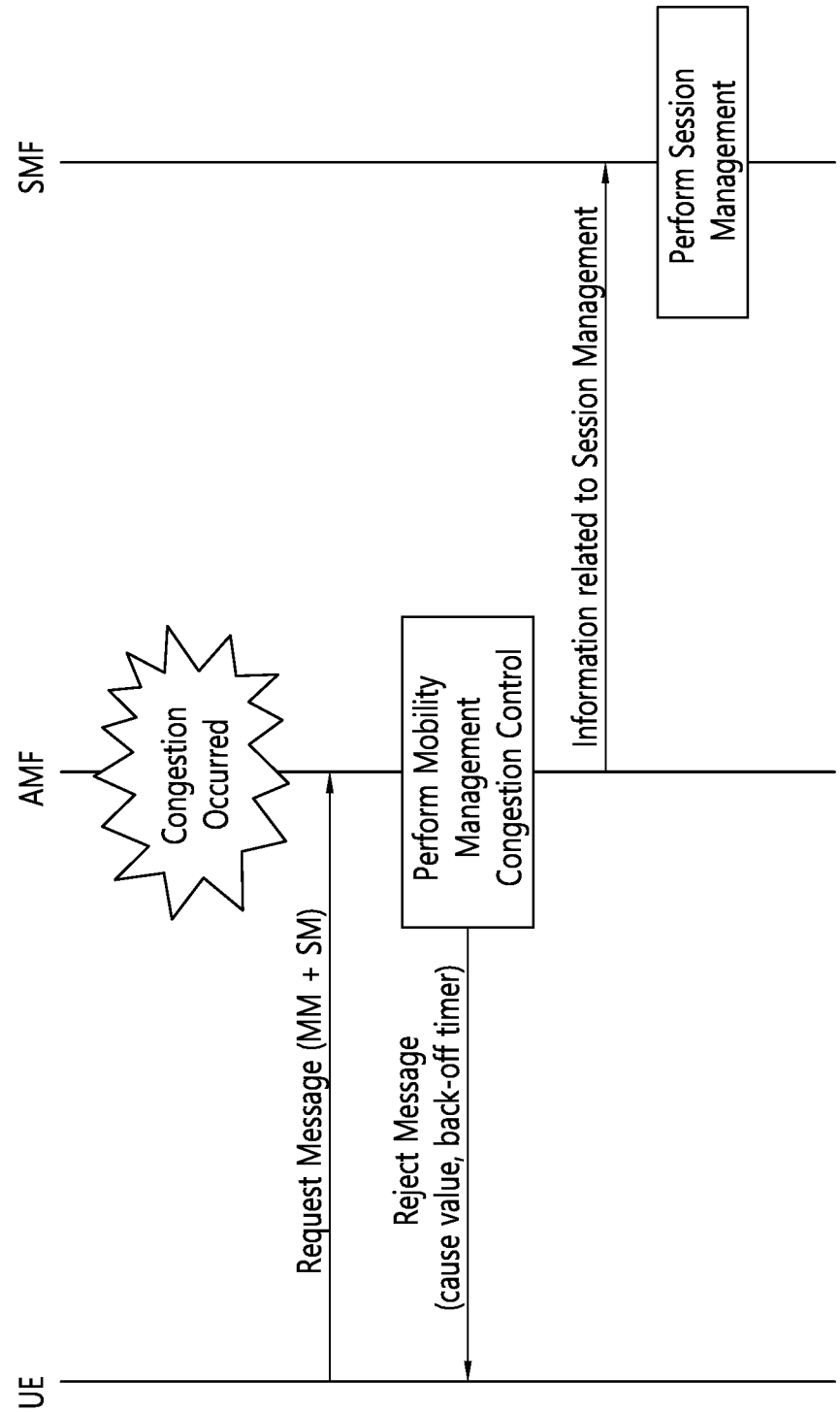
FIGS. 8a and 8b show a method of performing mobility management congestion control when AMFs are congested.
Figure 8B:
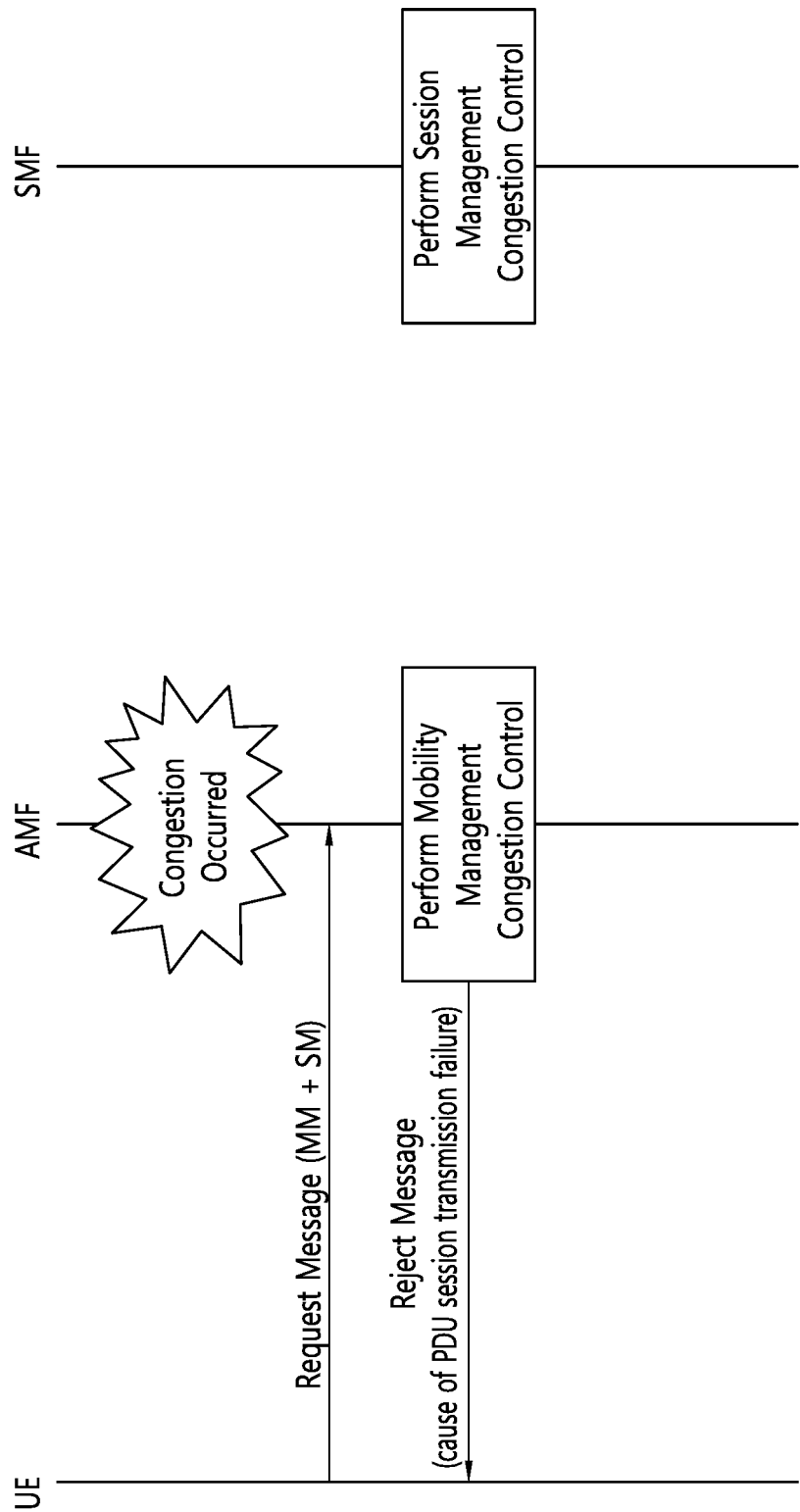

FIGS. 8a and 8b show a method of performing mobility management congestion control when AMFs are congested.

Referring to FIG. 8a, a UE may transmit, to an AMF, a request message including information (e.g., an attach request, a registration request, a location update request (TAU), a service request) on mobility management (MM) in order to request access to a network system. The request message may further include information on session management (SM).

If mobility management congestion occurs in an AMF, the AMF may transmit, to a UE, a reject message that rejects the request of the UE in order to perform mobility management congestion control. The AMF may forward (deliver), to an SMF, information (e.g., a PDU session request, PDU session request modification, PDU session request deactivation, a PDU session disconnect/release request) related to session management, among information on the session management included in the request message.

An SMF may perform session management using received information related to the session management independently of mobility management congestion control of an AME The reject message may include information on a cause of mobility management congestion and a mobility management back-off timer. A UE may drive the mobility management back-off timer. The UE may not transmit, to an AMDF, a request message related to mobility management until the mobility management back-off timer expires. That is, after the mobility management back-off timer expires, the UE may transmit, to the AMF, the request message related to mobility management. However, the UE may transmit the request message to the AMF in order to perform a service related to an urgent situation, a mobile terminated service or a specially high priority service before the mobility management back-off timer expires.

Referring to FIG. 8b, a UE may transmit, to an AMF, a request message including information (e.g., an attach request, a registration request, a location update request (TAU), a service request) on mobility management (MM) in order to request access to a network system. The request message may further include information on session management (SM).

According to one embodiment, if mobility management congestion occurs in an AMF, the AMF may also perform session management congestion control along with mobility management congestion control. The AMF may transmit, to a UE, a reject message that rejects the request of the UE in order to perform mobility management congestion control. Although only mobility management congestion has occurred, the AMF may reject information on a session management or session management procedure included in the request message. That is, if mobility management congestion occurs in the AMF, the AMF rejects information on session management procedure. Accordingly, the AMF may resultantly perform session management congestion control along with mobility management congestion control.

The reject message may include information indicating that a transmission failure of information on mobility management congestion and information related to session management has occurred due to mobility management congestion.

According to one embodiment, the reject message may further include a mobility management back-off timer and/or a session management back-off timer. According to one embodiment, a value of the mobility management back-off timer included in the reject message may be greater than a value of the session management back-off timer included in the reject message.

The session management back-off timer (i.e., the session management back-off timer included in the reject message) provided by the AMF may be different from the session management back-off timer provided by an SMF (i.e., as described later in FIGS. 9a and 9b, the session management back-off timer provided by the SMF due to the congestion of the SMF).

A UE may separately store a session management back-off timer provided by an AMF and a session management back-off timer provided by an SME The UE may separately drive the session management back-off timer provided by the AMF and the session management back-off timer provided by the SMF. That is, when the UE receives the session management back-off timer provided by the AMF, the UE may recognize that session management congestion control is performed because mobility management congestion occurs. When the UE receives the session management back-off timer provided by the SMF, the UE may recognize that session management congestion control is performed due to the occurrence of session management congestion.

The (E)MM layer (or 5GMM layer) of a UE may receive, manage and/or drive a mobility management back-off timer provided by an AMF. Furthermore, the (E)SM layer (or 5GSM layer) of the UE may receive, manage and/or drive a session management back-off timer provided by an SMF. However, according to one embodiment, if an AMF provides a session management back-off timer, the (E)MM layer (or 5GMM layer) of a UE may receive the session management back-off timer provided by the AMF. The (E)MM layer (or 5GMM layer) of the UE may forward, to the (E)SM layer (or 5GSM layer), the received session management back-off timer provided by the AMF. Accordingly, the (E)SM layer (or 5GSM layer) may manage and drive the received session management back-off timer provided by the AMF.

According to one embodiment, a value of a session management back-off timer provided by an AMF may be equal to or smaller than a value of a session management back-off timer provided by an SMF.

The UE may drive the mobility management back-off timer and the session management back-off timer included in the reject message. That is, the UE may not transmit, to the AMF, a request message related to mobility management until the mobility management back-off timer expires. The UE may transmit, to the AMF, a request message related to mobility management after the mobility management back-off timer expires. Furthermore, the UE may not transmit, to the AMF (or the SMF), the request message related to session management until the session management back-off timer expires. That is, the UE may transmit, to the AMF (or the SMF), the request message related to session management after the session management back-off timer expires.

According to one embodiment, if a value of a mobility management back-off timer (i.e., mobility management back-off timer included in a reject message) provided by an AMF is greater than a value of a session management back-off timer (i.e., a session management back-off timer included in a reject message) provided by the AMF, the session management back-off timer may expire before the mobility management back-off timer expires. In this case, a UE may transmit, to the AMF (or the SMF), a request message related to session management.

Figure 9A:
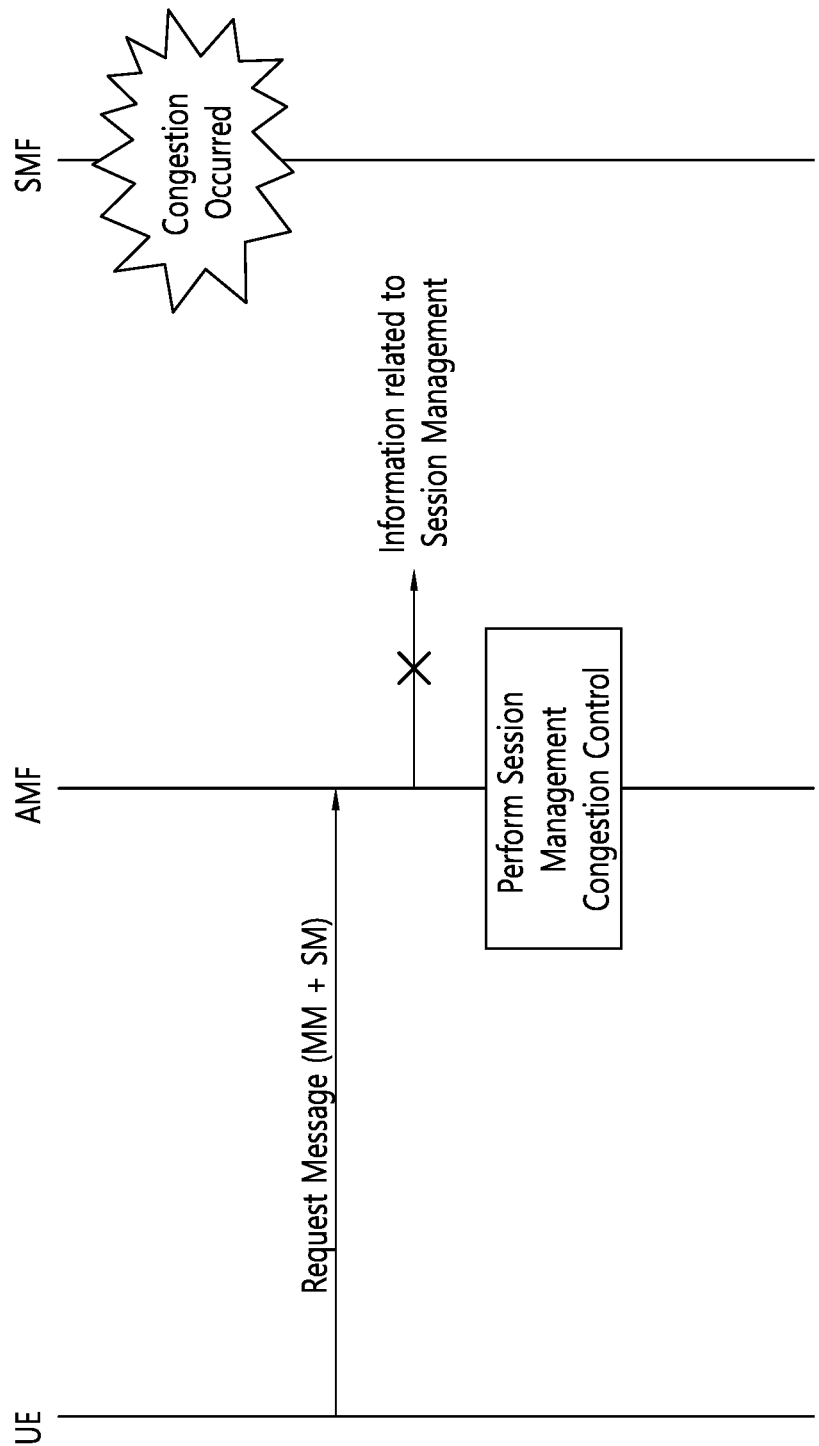
FIGS. 9a and 9b show a method of performing session management congestion control when SMFs are congested.
Figure 9B:
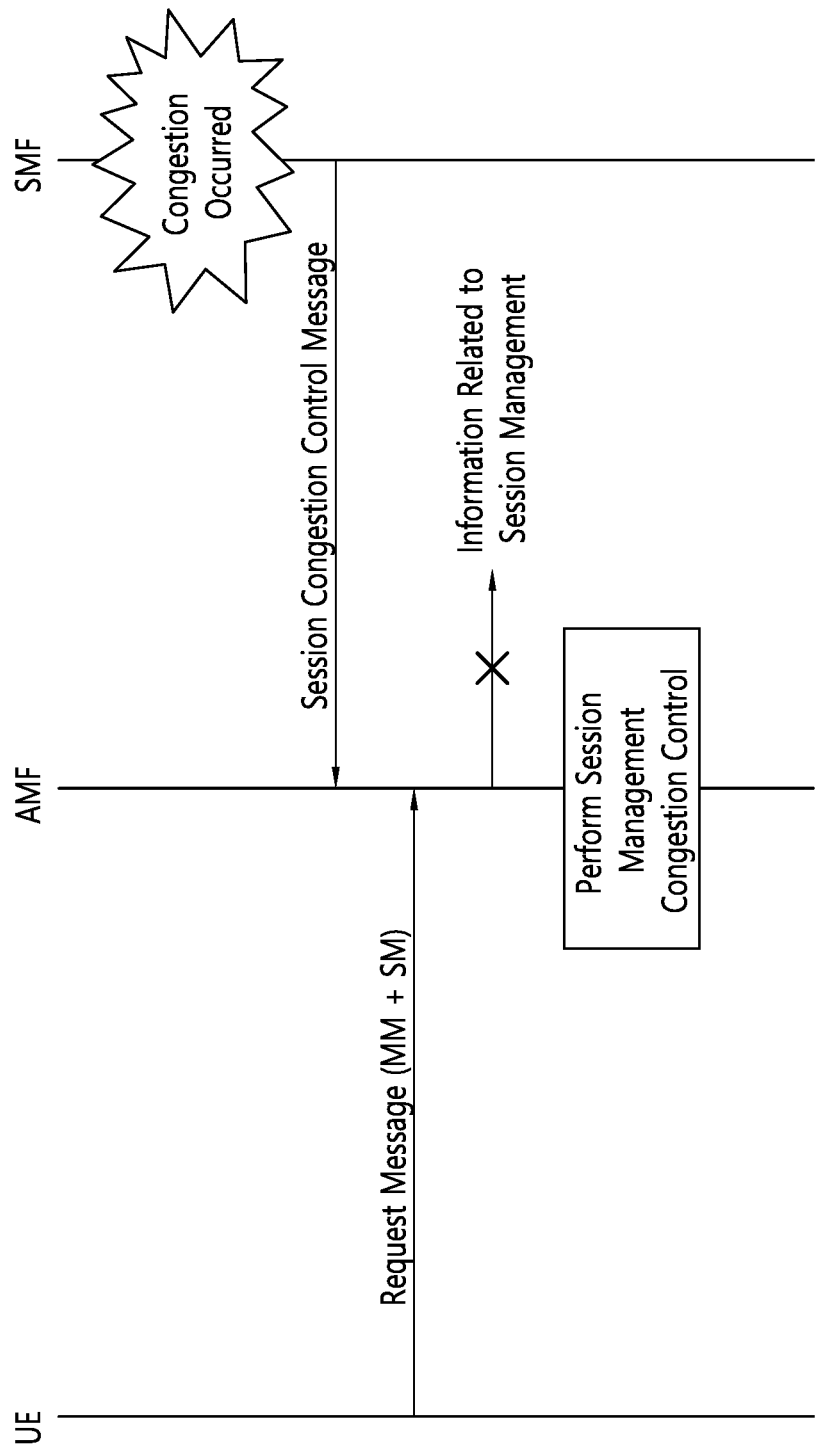

FIGS. 9a and 9b show a method of performing session management congestion control when SMFs are congested.

Referring to FIG. 9a, a UE may transmit, to an AMF, a request message (NAS signaling request message) including information (e.g., an attach request, a registration request, a location update request (TAU), a service request) on mobility management (MM) in order to request access to a network system. The request message may further include information on session management (SM) (e.g., a PDU session request and a service request, PDU session request modification, PDU session request deactivation, a PDU session disconnect/release request). The AMF may perform mobility management using the received request message, and may forward, to an SMF, information (e.g., a PDU session request, PDU session request modification, PDU session request deactivation, a PDU session disconnect/release request) related to a PDU session included in the request message. The SMF may perform session management congestion control using the received information related to the PDU session.

However, if session management congestion occurs in the SMF, the AMF does not forward the information related to the PDU session to the SMF and may transmit, to the UE, a reject message indicating that the request of the UE has been rejected because the forwarding of the information related to the PDU session from the AMF to the SMF may cause unnecessary network resource waste and signaling overhead.

Referring to FIG. 9*b*, according to one embodiment, if session management congestion occurs in an SMF, the SMF may previously notify an AMF that the session management congestion has occurred through a session congestion/overload control message. After receiving the session congestion/overload control message from the SMF, the AMF may activate session congestion/overload. After the session congestion/overload is activated, the AMF may perform session management congestion control using information related to a PDU session included in a request message. The session congestion/overload control message may include a UE ID, a PDU session ID, a network slice ID, a group ID, a service type ID APN (or DNN) or additional information (at least one of an IP address, a port number, an application ID or a specific instance ID).

If an AMF forwards only an NAS message, related to session management, to an SMF, the AMF cannot separately perform mobility management congestion control and session management congestion control. Accordingly, in order for the AMF to separately perform the mobility management congestion control and the session management congestion control, according to one embodiment, a UE may transmit, to the AMF, a request message including type information to identify the type of PDU session. Furthermore, according to another embodiment, separately from the request message, the UE may transmit, to the AMF, type information to identify the type of PDU session.

According to one embodiment, the type information (SM type) to identify the PDU session may have the following format.

PDU session Request: SM type=01(001) or SM type=mo-pdusession

Modify PDU session Request: SM type=02(010) or SM type=mo-modifypdusession

PDU session disconnect/release request: SM type=03 (011) or SM type=mo-pdusessiondisconnect/release Deactivate PDU session request: SM type=04 100 or SM type=mo-deactivatepudsession SM type=01, 02, 03, 04 may be set to respective bit strings 001, 010, 011, 100.

According to one embodiment, the NAS layer of a UE may forward, to the AS layer of the UE, type information (SM type) to identify a PDU session. The AS layer of the UE may transmit, to an AMF, an RRC message including a request message (NAS signaling request message). Alternatively, according to another embodiment, the AS layer of the UE may recognize (or generate) type information (SM type) to identify a PDU session. The AS layer of the UE may transmit, to an AMF, the RRC message including the request message (NAS signaling request message). That is, the AMF may identify (interpret) information related to a PDU session, included in the request message of the UE, using the type information (SM type) to identify the PDU session. The AMF and the SMF may perform mobility management congestion control and session management congestion control based on a result of the identification (interpretation).

Furthermore, according to one embodiment, the AMF may perform congestion control based on at least one of priority (low priority, overriding low priority (i.e., higher priority)) of the request message (NAS signaling message) or emergency. Information on the priory of the request message (NAS signaling message) and the emergency may be included in type information (SM type) to identify the PDU session as follows.

low priority PDU session Request: SM type=05(101) or SM type=mo-pdusession-lowpriority overriding low priority PDU session Request: SM type=06 110 or SM type=mo-pdusession-overriding-lowpriority emergency PDU session Request: SM type=07(111) or SM type=mo-pdusession-emergency In this case, overriding low priority and emergency may mean that a request message is performed without performing congestion control although a congestion situation occurs in a network system, and low priority may mean that congestion control is performed.

According to one embodiment, the NAS layer of a UE may forward type information (SM type) to identify a PDU session to the AS layer of the UE. The AS layer of the UE may transmit, to an AMF, an RRC message including a request message (NAS signaling request message). Alternatively, according to another embodiment, the AS layer of a UE may recognize (or generate) type information (SM type) to identify a PDU session. The AS layer of the UE may transmit, to an AMF, an RRC message including a request message (NAS signaling request message). That is, the AMF may identify (interpret) information related to the PDU session, included in the request message of the UE, using the type information (SM type) to identify the PDU session. The AMF and an SMF may perform mobility management congestion control and session management congestion control based on a result of the identification (interpretation).

In this case, the mobility management congestion control and session management congestion control operation of the UE and the AMF and the SMF follow the method of FIG. 8*b*.

Figure 10:
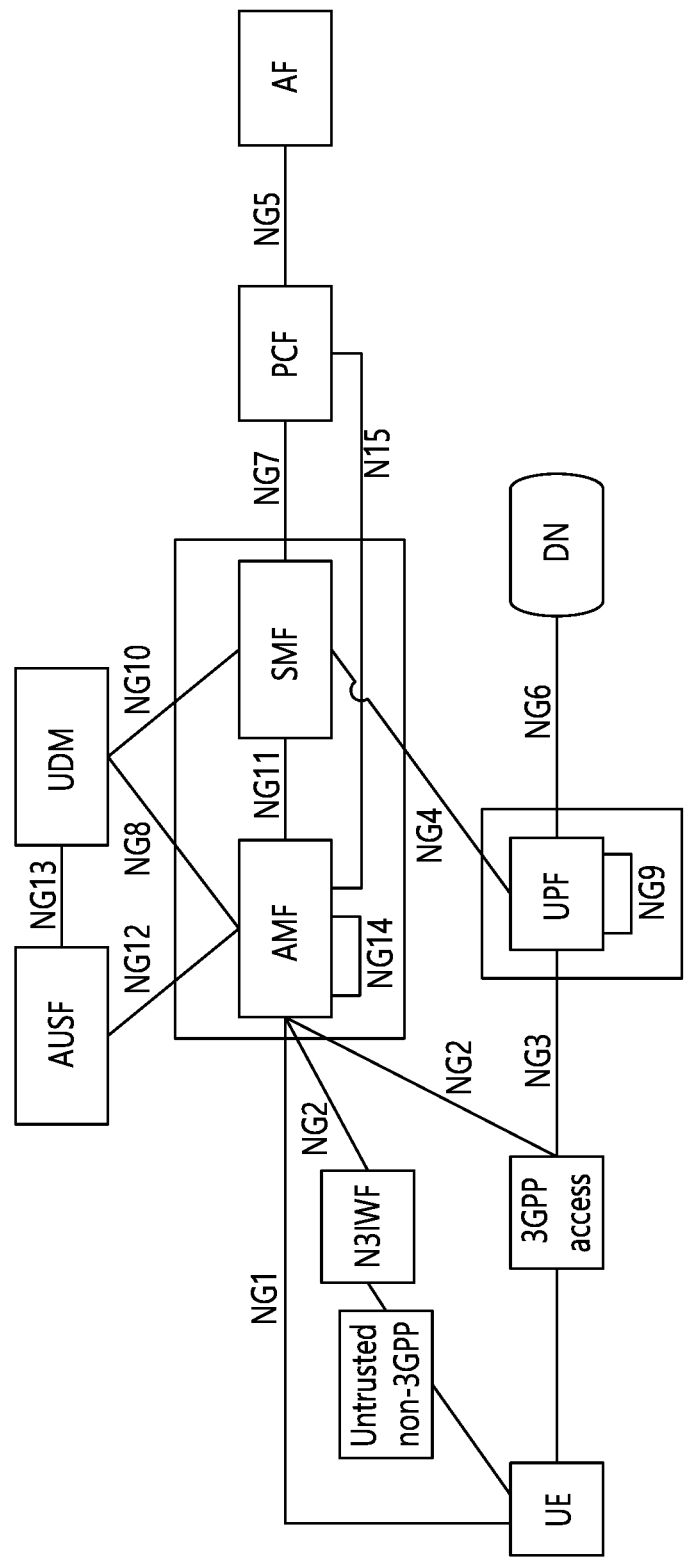
FIG. 10 shows a method of performing congestion control when a UE can access a system over different networks.
Figure 11:
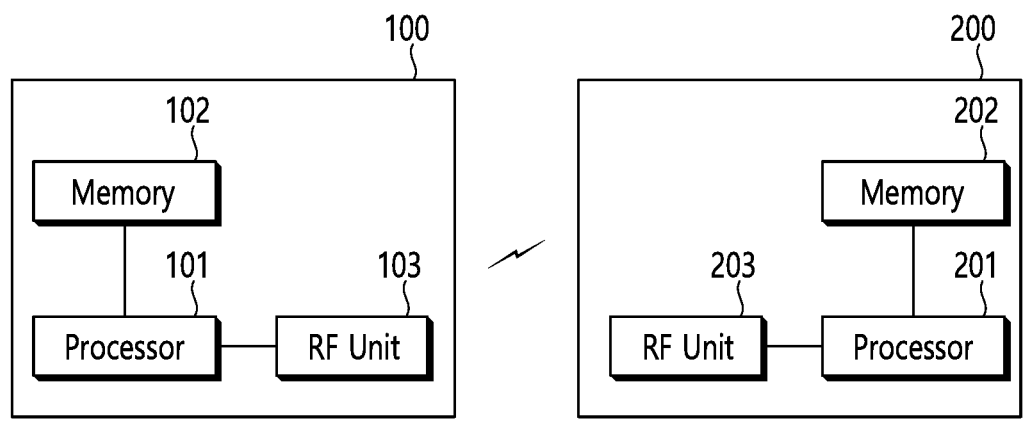
FIG. 11 is a block diagram illustrating a wireless communication system that implements the embodiments of the present invention.

FIG. 10 shows a method of performing congestion control when a UE can access a system over different networks.

Referring to FIG. 10, a UE may access a network system over two different access networks. The two different access networks may be a 3GPP access network and a non-3GPP access network (e.g., a wireless local area network (WLAN)). According to one embodiment, the UE may access a network system over a 3GPP access network and a non-3GPP access network using an NG2 interface in the same manner.

The UE may separately transmit a request message (NAS signaling message), transmitted to an AMF, over the 3GPP access network (e.g., 5G NextGen NR or LTE-A Pro AN) and a request message (NAS signaling message), transmitted to the AMF, over the non-3GPP access network (e.g., WLAN).

Accordingly, the AMF that has received the request message from the UE may identify whether the AMF is an access network or a 3GPP access network or a non-3GPP access network, and may perform mobility management congestion control.

The request message may include information a radio access technology (RAT) on which the UE has camped. The information on the RAT may be provided by the NAS layer of the UE or the AS layer of the UE. Alternatively, an access network node (GnodeB or eNodeB) may transmit information on the RAT to the AMF or an SME According to one embodiment, if mobility management congestion occurs in the AMF, the AMF may transmit a reject message to the UE as a response to the request message of the UE. The reject message may include a back-off timer. The back-off timer may be a back-off timer regarding mobility management congestion control. The back-off timer may include information on an RAT. Accordingly, the back-off timer may be applied to only an access network corresponding to the information on the RAT. For example, if the information on the RAT included in the back-off timer is information regarding a 3GPP access network, the back-off timer is applied to only congestion control over the 3GPP access network, but may not be applied to congestion control over a non-3GPP access network.

According to another embodiment, if session management congestion occurs in the SMF, the SMF may transmit a reject message to the UE as a response to the request message of the UE. The reject message may include a (session management) back-off timer. The back-off timer may include information on an RAT. The back-off timer may be a back-off timer regarding session management congestion control. Accordingly, the back-off timer may be applied to only an access network corresponding to the information on the RAT. For example, if the information on the RAT included in the back-off timer is information regarding a 3GPP access network, the back-off timer is applied to only congestion control over a 3GPP access network, and may not be applied to congestion control over a non-3GPP access network.

According to one embodiment, if the information on the RAT is not included in the request message, a back-off timer is also not included in the information on the RAT. Accordingly, congestion control may be applied to all access networks regardless of the type of access network.

Furthermore, according to another embodiment, if the back-off timer includes information on all RATs, congestion control may be applied to all access networks regardless of the type of access network.

If congestion control is applied, a UE may not transmit a request message over an access network (i.e., an access network corresponding to information on an RAT included in a back-off timer) to which congestion control is applied until a back-off timer expires. However, the UE may transmit a request message (NAS signaling message) to the AMF and/or an SMF over an access network to which congestion control is not applied.

Details mentioned so far may be implemented by hardware.

FIG. 14 is a block diagram illustrating a wireless communication system that implements the embodiments of the present invention.

A BS 200 includes a processor 201, a memory 202 and an RF unit 203. The memory 202 is connected to the processor 201, and stores various pieces of information for driving the processor 201. The RF unit 203 is connected to the processor 201, and transmits and/or receives radio signals. The processor 201 implements proposed functions, processes and/or methods. In the above embodiment, an operation of the BS may be implemented by the processor 201.

A wireless device 100 includes a processor 101, a memory 102 and an RF unit 103. The memory 102 is connected to the processor 101, and stores various pieces of information for driving the processor 101. The RF unit 103 is connected to the processor 101, and transmits and/or receives radio signals. The processor 101 implements proposed functions, processes and/or methods. In the above embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of performing access control in a network system including an access and mobility function (AMF) node related to mobility management (MM) and a session management function (SMF) node related to session management (SM), the method performed by the AMF and comprising:
   receiving, from a user equipment (UE), a request message to request access to the network system, wherein the request message comprises first information related to the MM and second information related to the SM; and
   based on MM congestion which occurs in the AMF node, transmitting, to the UE, a reject message related to the first information and forwarding, to the SMF node, the second information, wherein the reject message includes an MM back-off time value used for an MM back-off timer of the UE and a reject cause related to the MM congestion.

2. The method of claim 1, wherein the first information related to the MM includes at least one of an attach request, a registration request, a location update request (TAU) and a service request.

3. The method of claim 1, wherein the second information related to the SM includes at least one of a protocol data unit (PDU) session request, a PDU session request modification, a PDU session request deactivation, a PDU session disconnect request and a PDU session release request.

4. The method of claim 1, wherein the reject cause in the reject message includes first cause information related to one of congestion, overload, or insufficient resources of the AMF node and second cause information identifying a node having the MM congestion.

5. The method of claim 1, wherein the request message further includes type information identifying a SM type, and the reject message is configured by the AMF node based on the type information.

6. The method of claim 5, wherein the request message further includes a priority of the request message, and the reject message is configured by the AMF node further based on the priority of the request message.

7. An access and mobility function (AMF) node related to mobility management (MM) in a network system including a session management function (SMF) node related to session management (SM), the AMF comprising:
   a transceiver configured to receive and transmit signals; and
   a processor configured to control the transceiver, wherein the processor is further configured to:
   receive, from a user equipment (UE), a request message to request access to the network system, wherein the request message comprises first information related to the MM and second information related to the SM; and
   based on MM congestion which occurs in the AMF node, transmit, to the UE, a reject message related to the first information and forwarding, to the SMF node, the second information, wherein the reject message includes an MM back-off time value used for an MM back-off timer of the UE and a reject cause related to the MM congestion.

8. The apparatus of claim 7, wherein the first information related to the MM includes at least one of an attach request, a registration request, a location update request (TAU) and a service request.

9. The apparatus of claim 7, wherein the second information related to the SM includes at least one of a protocol data unit (PDU) session request, a PDU session request modification, a PDU session request deactivation, a PDU session disconnect request and a PDU session release request.

10. The apparatus of claim 7, wherein the reject cause in the reject message includes first cause information related to one of congestion, overload, or insufficient resources of the AMF node and second cause information identifying a node having the MM congestion.

11. The apparatus of claim 7, wherein the request message further includes type information identifying a SM type, and the reject message is configured by the AMF node based on the type information.

12. The apparatus of claim 11, wherein the request message further includes a priority of the request message, and the reject message is configured by the AMF node further based on the priority of the request message.

* * * * *